(12) United States Patent
Palmade et al.

(10) Patent No.: US 12,101,139 B2
(45) Date of Patent: Sep. 24, 2024

(54) MALE DEVICE, ELECTRONIC TAG AND NEAR-FIELD COMMUNICATION SYSTEM

(71) Applicant: CENTILOC, Meyreuil (FR)

(72) Inventors: Romain Palmade, Auriol (FR); Loïc Henninot, La Penne sur Huveaune (FR); Frédérick Bonnin, Rousset (FR)

(73) Assignee: CENTILOC, Meyreuil (FR)

( * ) Notice: Subject to any disclaimer, the term of this patent is extended or adjusted under 35 U.S.C. 154(b) by 0 days.

(21) Appl. No.: 17/637,105

(22) PCT Filed: Sep. 8, 2020

(86) PCT No.: PCT/EP2020/075118
§ 371 (c)(1),
(2) Date: Feb. 22, 2022

(87) PCT Pub. No.: WO2021/048151
PCT Pub. Date: Mar. 18, 2021

(65) Prior Publication Data
US 2022/0302961 A1    Sep. 22, 2022

(30) Foreign Application Priority Data
Sep. 10, 2019   (FR) ..................... 1909939

(51) Int. Cl.
*H04B 5/72*    (2024.01)
*G08B 13/24*   (2006.01)
(Continued)

(52) U.S. Cl.
CPC ........... *H04B 5/72* (2024.01); *G08B 13/2431* (2013.01); *G08B 13/2462* (2013.01);
(Continued)

(58) Field of Classification Search
CPC .. H04B 5/0031; H04B 5/0062; H04B 5/0081; H04B 5/0087; H04B 5/72; H04B 5/26;
(Continued)

(56) References Cited

U.S. PATENT DOCUMENTS

2004/0195319 A1* 10/2004 Forster ............... G06K 7/10346
                                                    235/451
2010/0060457 A1*  3/2010 Burnside ............. H01Q 1/2216
                                                    343/810
2015/0287527 A1   10/2015 Kasar

FOREIGN PATENT DOCUMENTS

FR         3100342 A1     3/2021

OTHER PUBLICATIONS

International Search Report (PCT/ISA/210) and Written Opinion (PCT/ISA/237) mailed on Sep. 28, 2020, by the European Patent Office as the International Searching Authority for International Application No. PCT/EP2020/075118. (16 pages).

* cited by examiner

*Primary Examiner* — Eugene Yun
(74) *Attorney, Agent, or Firm* — Buchanan Ingersoll & Rooney PC

(57) ABSTRACT

The invention relates to a male device comprising an elongate portion and an antenna. The elongate portion extends in one direction between a first end and a second end, and is intended for receiving at least one female device by threading from the first end. The near-field communication antenna is placed inside the elongate portion and comprises at least one conductive turn comprising two connection terminals at the second end, the two connection terminals being intended for being connected to a reading circuit, the conductive turn being positioned so as to produce at least one magnetic field generating a flux passing through the elongate portion
(Continued)

perpendicularly to the direction when the antenna is traversed by a current produced by the reading circuit.

9 Claims, 4 Drawing Sheets

(51) Int. Cl.
    *H04B 5/26* (2024.01)
    *H04B 5/77* (2024.01)

(52) U.S. Cl.
    CPC ........... *G08B 13/2474* (2013.01); *H04B 5/26* (2024.01); *H04B 5/77* (2024.01)

(58) Field of Classification Search
    CPC .. H04B 5/77; G08B 13/2431; G08B 13/2462; G08B 13/2474
    USPC ........................................................ 455/41.1
    See application file for complete search history.

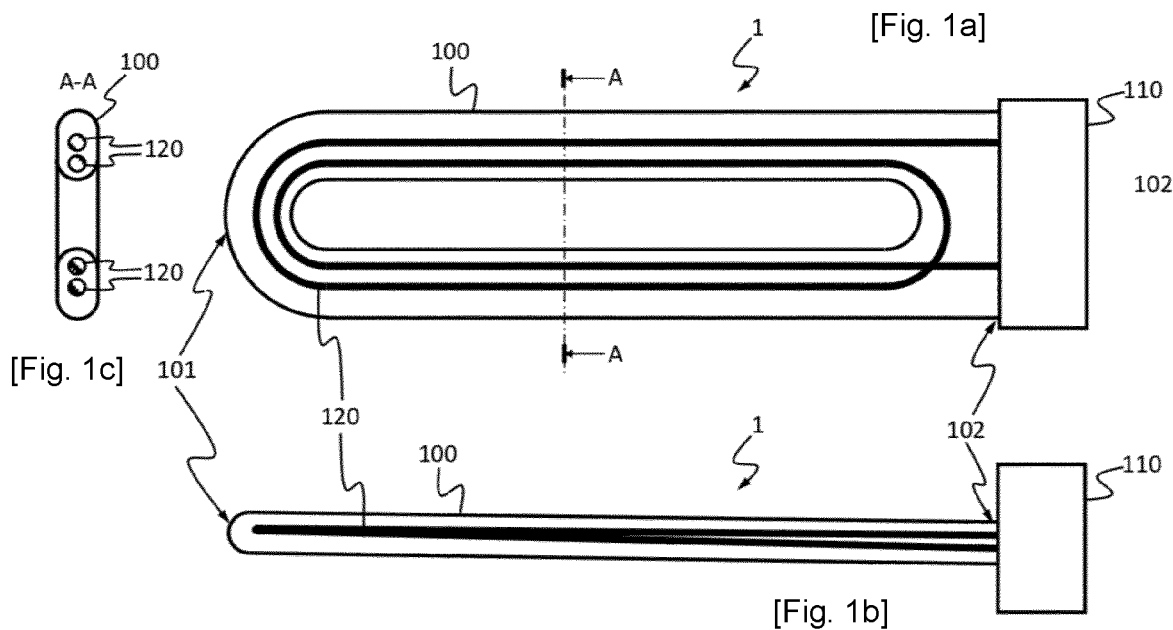
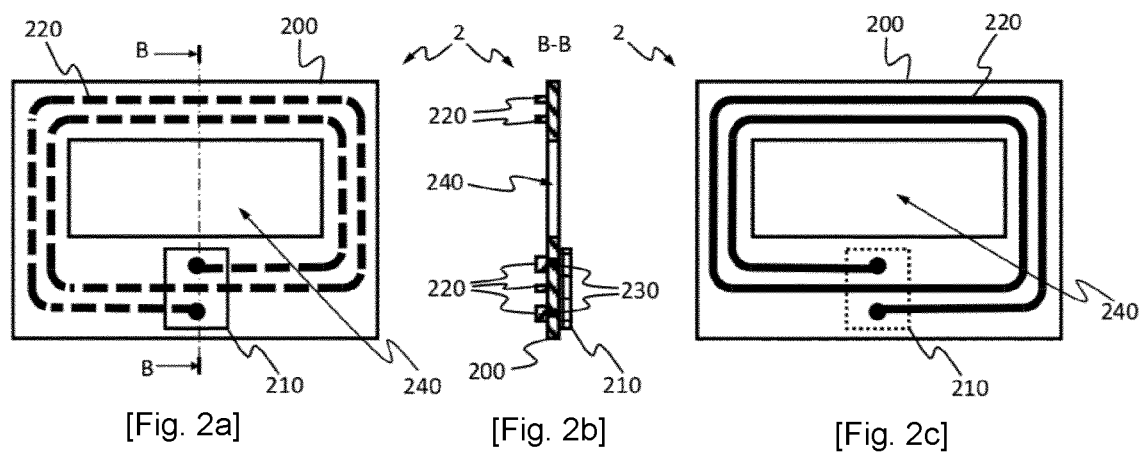

[Fig. 3]
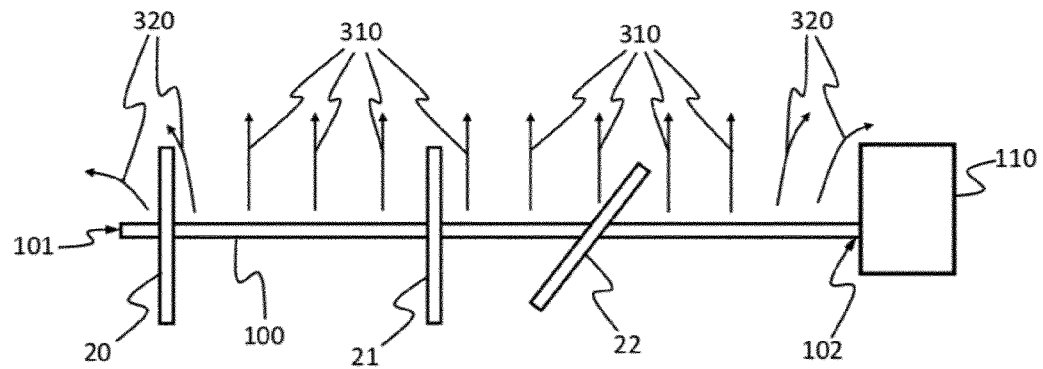
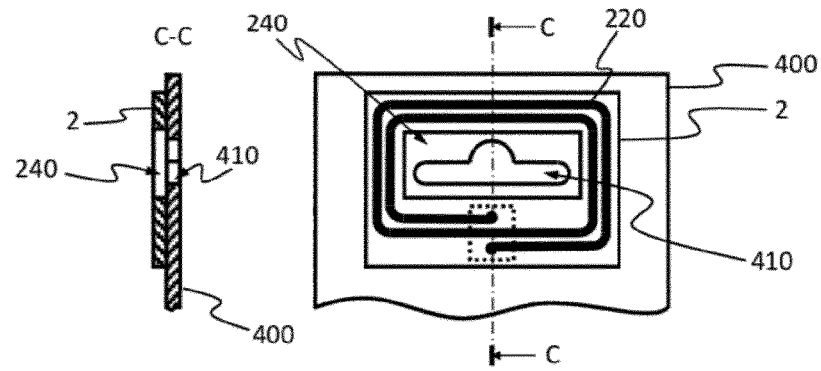
[Fig. 4b]   [Fig. 4a]
[Fig. 5]
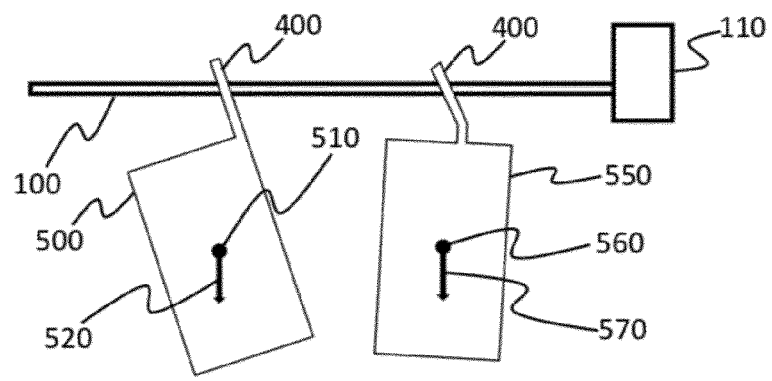

[Fig. 6]
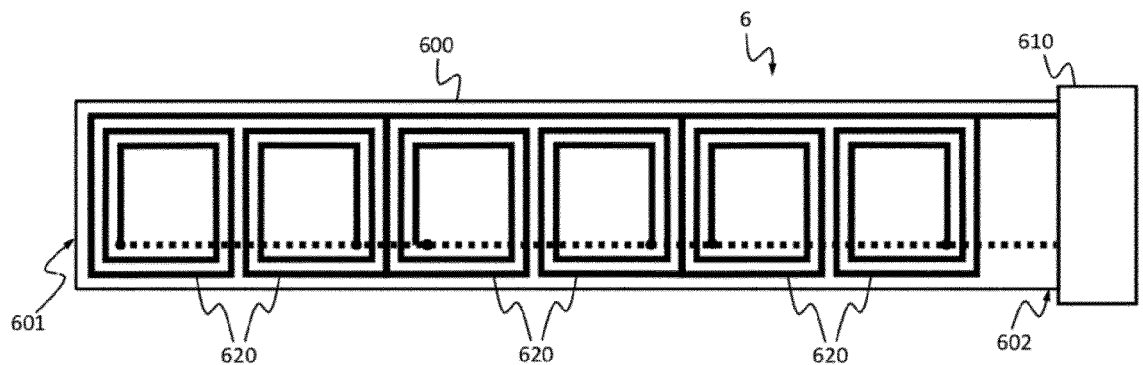
[Fig. 7]
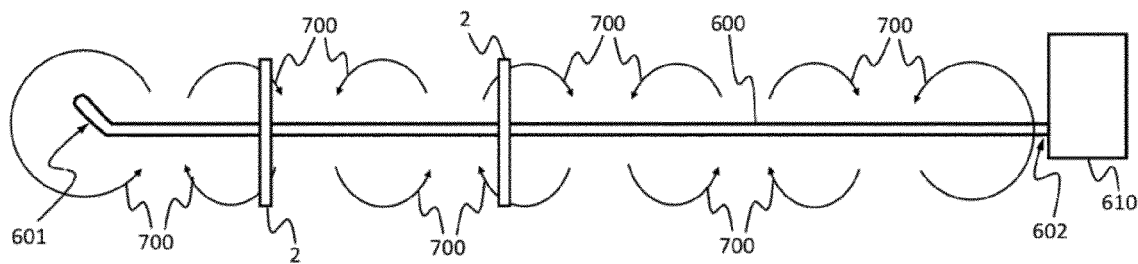
[Fig. 8]
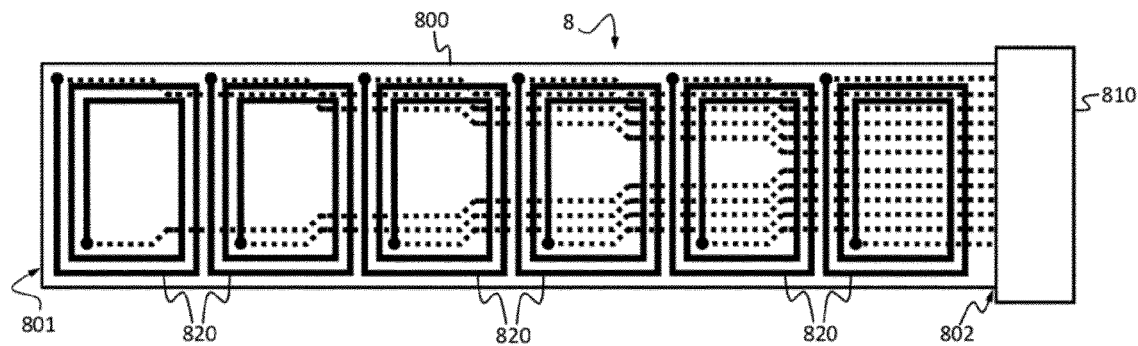

[Fig. 9]
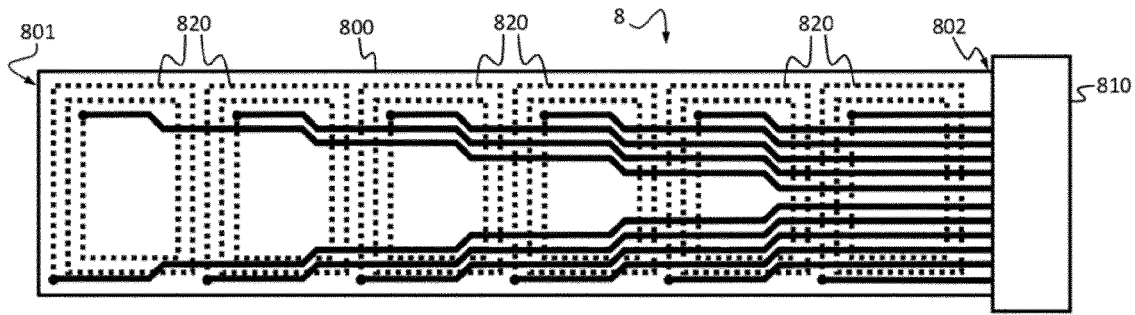
[Fig. 10]
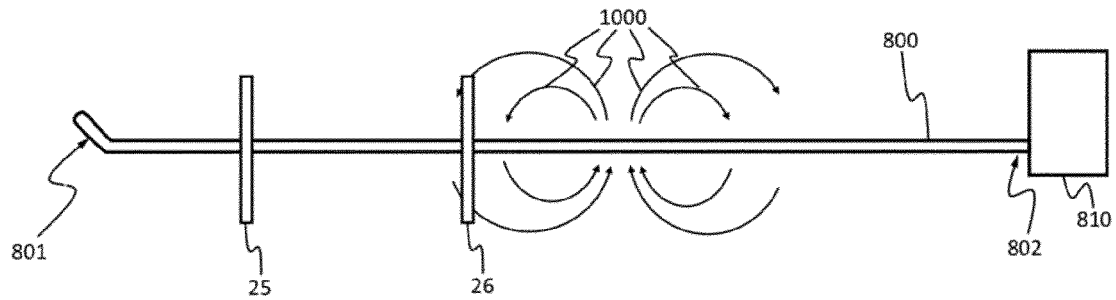
[Fig. 11]
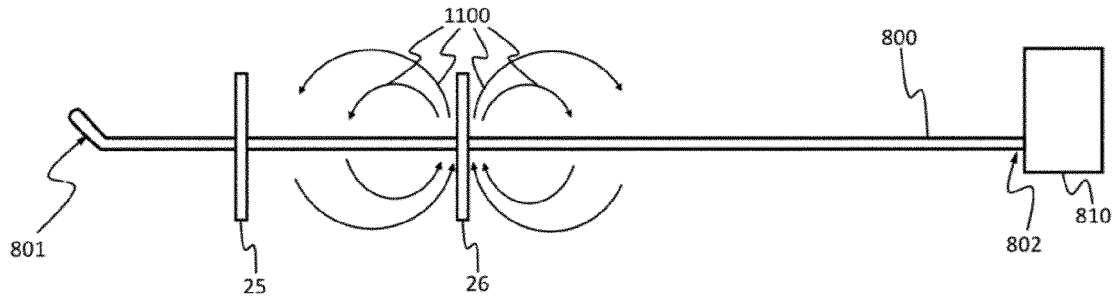
[Fig. 12]
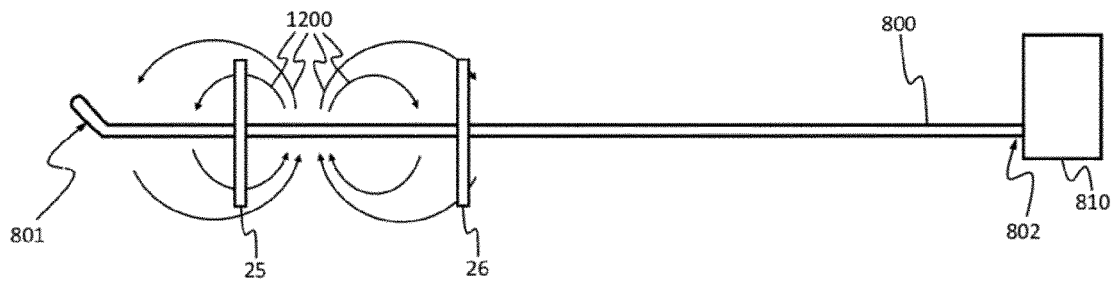

MALE DEVICE, ELECTRONIC TAG AND NEAR-FIELD COMMUNICATION SYSTEM

TECHNICAL FIELD

The present invention relates to a male device, a female device and a near-field communication system.

TECHNOLOGICAL BACKGROUND

Automatic object tracking in a given area can be carried out in different ways. With respect to electronic anti-theft systems, it is known to place electromagnetic terminals at the shop exit and to equip products with an anti-theft device comprising a resonant circuit tuned to the frequency of the electromagnetic field of said terminals. As soon as an anti-theft device is placed in the field produced by the electromagnetic terminals, it starts to resonate and creates a significant disturbance in the electromagnetic field. This disturbance is easily detectable and makes it possible to locate an anti-theft device present in a predetermined area. However, such a tracking process does not make it possible to identify an object associated with said device exactly.

Two more recent technologies make a more accurate object identification possible. RFID (Radio Frequency Identification) and NFC (Near-Field Communication) technologies use an electronic chip coupled to an antenna which makes it possible to communicate with a reader, while using the electrical or magnetic field produced by the reader to power the electronic chip. These two technologies make it possible to send an identifier, generally unique, to a reader as soon as the identification object is located in the communication field of the reader, making it possible to identify an object accurately in a predetermined area, without the object or its identification device having an intrinsic power source. RFID technology uses an electrical field which makes it possible to communicate with one or more identification devices from a few metres away without making it possible to be able to locate an object accurately. NFC technology uses a magnetic field which makes communication possible at a few centimetres from the reader.

In object-locating applications, there are particular needs which require a high level of accuracy of the locating and identification of objects. By way of example, in the field of interactive games, there is a need to track playing pieces on a game board. In the commercial field, there is a need to track and identify the products present in a shelf display in order to be able to do a stock take quickly and also to locate the products presented to the customer(s).

The French patent application filed on 29 Aug. 2019, under the number 19-09528 and with the title "plateau de communication en champ proche et procédé de localisation sur ledit plateau", discloses a communication surface using NFC technology which makes it possible to accurately locate an object equipped with an electronic tag on a communication surface. Said patent application proposes a solution that can be used both in the field of games and for object tracking on a shelving unit or a shop display stand. The above-mentioned surface proposes a solution that makes it possible for a shopkeeper to be informed when a display stand is empty or when products are not placed on the correct display stand, thus making it possible to restock or tidy up the display stand respectively.

A sales shelf display is not limited to display stands for products in trays. In fact, there are wall display stands with hooks. This type of hook display stand is particularly suitable for products with small dimensions having a plastic or card packaging comprising a suspension hole. The hook wall display stand makes it possible to present different versions of a product in an organized manner. By way of example, each hook of the display stand can be dedicated to a particular dimension or size of a product presented to the customer. For this purpose, it is important that the products are arranged correctly on the hooks in order to make it easier for the customer to choose.

The use of a communication surface positioned vertically and equipped with hooks can make it possible to track the position of products equipped with an identification device when they are placed on the hooks. However, such a solution is not satisfactory. The use of NFC technology for accurate locating is limited to communications over distances smaller than ten centimetres. The display stand hooks can have a length ranging up to 40 centimetres. There is therefore a need for tracking in hook display stands.

SUMMARY OF THE INVENTION

The invention aims to solve the problem of locating products on a hook display stand. For this, the invention proposes a solution in which a male part integrates an NFC reading antenna and a female part, comprising a hole, integrates an NFC identification device having its antenna around said hole. Thus, the antenna of the NFC reader is located inside the antenna of the NFC identification device.

According to a first embodiment, the invention proposes a male device of a near-field communication system comprising an elongate portion and at least one near-field communication antenna. The elongate portion extends in a threading direction between a first end and a second end, and it is intended to receive at least one female device around the elongate portion by threading from the first end. The at least one near-field communication antenna is placed inside the elongate portion and comprises at least one conductive turn comprising two connection terminals at the second end, the two connection terminals being intended to be connected to a reader circuit, the conductive turn being positioned so as to produce at least one magnetic field generating a flux passing through the elongate portion perpendicularly to the threading direction when the antenna is traversed by a current produced by the reader circuit.

For reasons of compactness and ease of use, the male device can comprise a mounting base integral with the second end, said base including a reader circuit connected to the connection terminals of said at least one antenna.

In order to improve the communication, several antennas can be used. The invention can comprise a plurality of antennas juxtaposed and aligned in the threading direction extending between the first end and the second end, each antenna comprising at least one turn.

Preferably, to simplify the manufacture, the antennas of the plurality of antennas can be produced on an insulating substrate and can be coplanar.

According to a first detection improvement, the antennas can be coupled together in parallel and two adjacent antennas can be oppositely polarized so that the direction of the magnetic field is inverted between two adjacent antennas.

According to a second detection improvement, each antenna of the plurality of antennas can comprise at least two connection terminals at the second end intended to be connected to the reader circuit.

According to the second detection improvement, the reader circuit can be configured to activate a single antenna of the plurality of antennas at a time in order to determine a position of the female device on the elongate portion.

According to a second embodiment, the invention proposes an electronic tag of a near-field communication system comprising a hole, a near-field communication antenna and an integrated circuit. The hole is intended to receive at least one male device. The near-field communication antenna comprises at least one conductive turn having two connection terminals, said turn surrounding the hole, said antenna converting a magnetic field into electrical current. The integrated circuit is connected to the connection terminals in order to be powered by the antenna.

To improve the communication, the electronic tag can comprise an orientation means for orienting the antenna with respect to the male device.

According to a third embodiment, the invention proposes a near-field communication system comprising a male device and one or more electronic tags as defined previously. The elongate portion of the male device is a display stand hook, the electronic tags constitute female devices threaded onto the male device and the hole of the electronic tags is a suspension hole for a product or a product packaging, the integrated circuit comprising a unique identifier for identifying the product with which it is associated.

BRIEF DESCRIPTION OF THE FIGURES

The invention will be better understood and other characteristics and advantages thereof will become apparent on reading the following description of particular embodiments of the invention, given as illustrative and non-limitative examples, and with reference to the attached drawings, in which:

FIGS. 1a-1c show a first embodiment example of a male device of a communication system according to the invention, FIGS. 2a-2c show a first embodiment example of a female communication device according to the invention, FIG. 3 illustrates the operation of the male device of FIGS. 1a-c with the female device of FIGS. 2a-c, FIGS. 4a-4b show a second embodiment example of a female communication device according to the invention, FIG. 5 shows examples of improvement of the female device of FIGS. 4a-b, FIG. 6 shows a second embodiment example of a male device of a communication system according to the invention, FIG. 7 illustrates the operation of the male device of FIG. 6 with the female device of FIGS. 2a-c, FIG. 8 shows a third embodiment example of a male device of a communication system according to the invention, FIG. 9 shows the male device of FIG. 8 from an opposite view, FIG. 10 illustrates the operation of the male device of FIGS. 8 and 9 with the female device of FIGS. 2a-c, FIG. 11 illustrates the operation of the male device of FIGS. 8 and 9 with the female device of FIGS. 2a-c, FIG. 12 illustrates the operation of the male device of FIGS. 8 and 9 with the female device of FIGS. 2a-c.

DETAILED DESCRIPTION

In the present document, by "near-field communication" is meant the NFC technology limited to a few centimetres, and using antennas produced using conductive loops forming half-transformers both on the reader side and on the electronic tag side. The communication produced in this way is effected via a magnetic field coupling the transmitting antenna of the reader and the energy harvesting antenna of an electronic tag.

In the present document, by "electronic tag" is meant an identification device comprising an electronic chip coupled to an antenna forming a coil and powering itself by means of the magnetic field created by the reader. Such an identification device is generally in the form of a tag which can be easily fastened on numerous types of packaging or products. However, the invention is not limited to a form factor of the "tag" type and can for example comprise any other form of electronic device.

Before the operation of locating a tag is explained in detail, the operation of a near-field communication between a reader and an electronic tag should be recalled first of all. The reader has an antenna, comprising one or more turns, tuned to a resonant frequency which corresponds to the frequency of the magnetic field transmitted, for example 13.56 megahertz. The electrical current traversing the turns of the antenna of the reader creates a magnetic field radiating close to the antenna. The electronic tag has an antenna, comprising one or more turns, tuned to the magnetic field transmitted by the reader. When the electronic tag is in the magnetic field of the reader, the antenna of the electronic tag starts to resonate and converts the magnetic field that it receives. If the magnetic field is large enough, the antenna of the electronic tag can power the electronic chip of said tag. The communication between the reader and the electronic tag is effected by modulation of the magnetic field. On the reader side, the modulation of the field is effected by modulating the current sent to the antenna, and therefore the transmitted field. On the electronic tag side, the modulation is effected by tuning and detuning the antenna of the electronic tag producing a modulated disturbance of the magnetic field, also called retro-modulation. The modulated disturbance of the magnetic field translates into a modulation of the current circulating in the antenna of the reader, which the latter can demodulate. For more details, a person skilled in the art can refer to the ISO standard 14443, which defines the operation of near-field communications.

In order for communication to be established between the reader and the electronic tag, the electronic tag must receive a magnetic field having enough power to power the chip of the electronic tag. The distance that makes communication between the reader and the electronic tag possible depends on the dimensioning of the antennas of the reader and the antenna of the electronic tag, but also on the transmission power of the reader. By using a low transmission power on the reader side, an electronic tag can only be detected if it is very close to the transmitting antenna. Moreover, the coupling between the antenna of the reader and the antenna of the electronic tag can vary as a function of the relative position of the antennas with respect to one another.

FIG. 1 shows a first embodiment example of a display stand hook 1 forming a male device according to the invention. FIG. 1a represents the display stand hook 1 in a view from above, FIG. 1b represents it in a view from the side, and FIG. 1c represents it in a cross section along the axis A-A indicated in FIG. 1a. The display stand hook 1 comprises an elongate portion 100 and a mounting base 110. The elongate portion extends in a direction between a first end 101 and a second end 102. The elongate portion 100 has a tapered shape and, for example, a flat section, in order to be able to receive a product or a product packaging equipped with a suspension hole by threading, from the first end 101. The second end 102 is fastened to the mounting base 110. The mounting base 110 is equipped with hanging means, not represented, in order to be fastened, for example removably, to a display stand wall, not represented, intended to receive the display stand hook 1.

An antenna 120 is placed inside the elongate portion 100. The antenna 120 is a near-field communication antenna constituted by one or more turns of conductive material. The antenna 120 comprises two ends forming connection terminals at the second end 102 intended to be connected to a reader circuit. In a preferred example the reader circuit is placed inside the mounting base 110. In a variant, the mounting base 110 comprises only connection elements intended to electrically connect the antenna 120 to a reader circuit placed in the display stand wall on which it is fastened. Whatever the embodiment, the reader circuit is for example a standard circuit conforming to the ISO standard 14443.

In this first embodiment example, the elongate portion 100 is, for example, produced using two half-shells moulded in plastic and forming an "O" that is elongated and hollow on the inside in order to receive the antenna 120 produced for example using an insulated conductive wire forming one or more turns. The assembly produced in this way forms an elongate portion 100 that is substantially flattened and can act as a hook. The configuration of the antenna 120 forms a loop from the first end 101 to the second end 102 so that the conductive wire constituting the antenna produces a magnetic field the flux of which is perpendicular to the central portion of the "O", i.e. perpendicular to the direction from the first end 101 to the second end 102 and perpendicular to the flattened portion.

In order to cooperate with the male device of FIG. 1, the female device, which is for example a product-marking electronic tag 2 as shown in FIG. 2, should be defined. FIG. 2a shows the tag on a first face, FIG. 2b shows the tag in a side view along the section B-B indicated in FIG. 2a, and FIG. 2c shows the tag on a second face opposite the first face. The tag comprises an insulating substrate 200 acting as a support for an electronic chip 210 placed on the first face and an antenna 220 placed on the second face. The chip 210 is connected to the antenna 220 via two holes 230 made in contact areas of the electronic chip 210 and the antenna 220. The substrate 200 is a, preferably flexible, insulating substrate such as for example paper, card, polyimide, polyester, epoxy resin, or any other material. The antenna 220 can be produced by printing of a conductive material, by silk-screen printing of silver, by etching of a copper layer integral with the substrate, by depositing or stitching of a copper wire, or any other technique used for producing printed circuits. The chip 210 is an identification and near-field communication chip.

The electronic tag 2 is distinguished from a conventional electronic tag by the presence of a hole 240 in its centre, the antenna 220 surrounding the hole 240. The hole 240 is intended to receive a male communication device such as the hook 1 described previously.

FIG. 3 illustrates the operation of the male device of FIG. 1 with the female device of FIG. 2. Female devices 20, 21 and 22, comprising an electronic tag 2, are placed along the elongate portion 100 of the device of FIG. 1. The positioning of the female devices 20, 21 and 22 is effected by threading from the first end 101. When a reader placed in the mounting base 110 powers the antenna 120 placed in the elongate portion 100, a magnetic field is created, said field being composed of a multitude of field lines 310 and 320.

In this FIG. 3, it can be seen that the field lines 310 situated in the central portion of the elongate portion 100 extend perpendicularly to said portion 100. Such an arrangement of the field lines 310 can have some drawbacks. The hole 240 of a female device 21 placed perpendicularly to the elongate portion 100 is not passed through by the field lines 310 and therefore cannot communicate with the reader of the male device. On the other hand, a female device 20 also placed perpendicularly with respect to the elongate portion 100 but close to one end 101 or 102 is passed through by field lines 320, which curve at this location. When a female device 22 is tilted, even slightly, with respect to the elongate portion, it also is passed through by the field lines 310.

In order to improve the coupling between the hook 1 of FIG. 1 and a female communication device, the placement of an electronic tag 2 on a product packaging should be considered. FIG. 4 shows an embodiment example of a female communication device 4 comprising an electronic tag 2 fastened on a tab 400 of a product packaging. FIG. 4a shows a partial view of the female communication device 4 corresponding to the tab 400 making it possible to hang the packaging of a product and FIG. 4b shows it in a cross section along the axis C-C indicated in FIG. 4a. In order to simplify the drawing, not all of the details of the electronic tag 2 are represented in FIG. 4.

The tab 400 comprises a suspension slot 410. The electronic tag 2 is fastened on the tab 400 in such a way that the suspension slot 410 is positioned at the hole 240. The fastening of the tag 2 on the tab 400 can be effected by bonding or any other means making it possible to make the tag 2 integral with the tab 400.

FIG. 5 shows two packagings 500 and 550, the tab 400 of which is positioned so as to tilt the electronic tag 2 when the packaging is suspended on the elongate portion 100 of a display stand hook.

The packaging 500 has a tab 400 in the extension of a vertical side of said packaging 500. Such an arrangement of the tab 400 makes the packaging 500 tilt naturally in order to align the suspension slot 410 with the centre of gravity 510 of the packaging 500 under the action of the force of gravity 520. A large number of packagings use such a positioning of the suspension tab, thus the adaptation of the invention to such packagings remains minimal and makes it possible to use a display stand hook as described in FIG. 1.

The packaging 550 is a packaging type having a suspension tab 400 substantially aligned with the centre of gravity 560 in the direction of the force of gravity 570. For this type of packaging, it is preferable to use a tab 400 tilted with respect to the packaging 550.

According to a variant that is not represented, it is possible to use a tab 400 that is thick enough that the suspension slot 410 makes it possible to ensure a guiding of the elongate portion 100. In this case, the electronic tag 2 is placed in a tilted manner in the thickness of the tab 400.

A display stand hook according to the example described in FIG. 1 makes it possible to detect the presence of the products which are suspended there. However, as has been described previously, the electronic tags must have a certain tilt in order to be able to be detected on the central portion of the elongate portion 100 of the male element. While it is easy to obtain a tilt of the electronic tag 2 for packagings 500 and 550 having a certain thickness, this is more difficult for very thin packagings.

In order to make it possible to detect an electronic tag 2 positioned perpendicularly over the whole length of an elongate portion of a display stand hook, a second embodiment example is detailed with the aid of FIG. 6. In FIG. 6, the display stand hook 6 comprises a male element 600 with an elongate shape extending in a direction from a first end 601 to a second end 602. The second end 602 is connected to a mounting base 610 serving to fasten the hook 6 to a vertical display stand wall, not represented.

The male element 600 comprises a plurality of antennas 620 juxtaposed and aligned in the direction passing through the first and second ends 601 and 602. Each antenna 620 comprises one or more turns. Two adjacent antennas 620 are oppositely polarized so that the direction of the magnetic field is inverted between two adjacent antennas 620. The antennas 620 are coupled together in parallel and connected to a reader circuit placed in the display stand wall or in the mounting base 610. Preferably, the antennas 620 are produced in a coplanar manner and for example etched on an insulating substrate according to a known technique for producing printed circuits. The printed circuit is then overmoulded in a plastic material in order to harden it for use as a display stand hook.

The antennas 620 connected in this way make it possible to alternate the magnetic field over the whole length of the elongate portion 600. FIG. 7 illustrates the field lines 700 of the hook 6 of FIG. 6. All the field lines 700 are perpendicular to the surface of the elongate portion but they curve in order to pass through a neighbouring antenna 620. Owing to such an arrangement of the antennas 620, whatever the position of an electronic tag 2 along the elongate portion, it is passed through by field lines 700, making it possible to detect all the electronic tags 2 threaded onto the elongate portion 600 of the hook 6.

By means of the hook 6, it is possible to detect what products are present. In particular, it is possible to detect that a product is present on the hook but it is not possible to know its exact position. FIGS. 8 and 9 show a third embodiment example of a male device of a communication system according to the invention, which makes it possible to track the position of an electronic tag on a display stand hook 8.

FIG. 8 shows the hook 8 in a view from above and FIG. 9 shows the hook 8 in a view from below. The display stand hook 8 comprises a male element 800 with an elongate shape extending in a direction from a first end 801 to a second end 802. The second end 802 is connected to a mounting base 810 serving to fasten the hook 8 to a vertical display stand wall, not represented.

The male element 800 comprises a plurality of antennas 820 juxtaposed and aligned in the direction from the first end 801 to the second end 802. Each antenna 820 comprises one or more turns and comprises at least two connection terminals brought to the level of the second end 802 in order to be connected to a reader circuit. In this embodiment the antennas 802 are individually connected to the reader circuit in order to be able to be used one by one by the reader circuit.

Preferably, the antennas 820 are produced in a coplanar manner and for example etched on an insulating substrate according to a known technique for producing printed circuits of the double-sided type. The printed circuit is then overmoulded in a plastic material in order to harden it for use as a display stand hook.

The reader circuit is preferably contained in the mounting base 810. The type of reader circuit used conforms for example to a reader circuit such as disclosed in the French patent application filed on 29 Aug. 2019, under the number 19-09528. Such a reader circuit uses the antennas 820 one by one to detect tags present on the elongate portion 800.

FIGS. 10, 11 and 12 illustrate the successive operation of three antennas 820 vis-à-vis two female devices 25 and 26 placed on the elongate portion 800. FIG. 10 shows the magnetic field lines 1000 produced by an active antenna 820. FIG. 11 shows the magnetic field lines 1100 produced by an active antenna 820 neighbouring the antenna 820 which is active in FIG. 10. FIG. 12 shows the magnetic field lines 1200 produced by a subsequent active antenna 820. The female devices 25 and 26 are equipped with electronic tags 2 conforming to those described according to FIG. 2.

In FIG. 10, the field lines 1000 pass through the female device 26 but do not pass through the female device 25, which is too far away. The reading device therefore can only detect the female device 26.

In FIG. 11, the field lines 1100 do not pass through the female device 25 and barely pass through the device 26. The device 26 is on a central position of the active antenna 820. The device 25 is very far away from the active antenna 820 and this distance means that detection is not automatic. The reading device can therefore detect that the female device 25 is far away from said active antenna 820.

In FIG. 12, the field lines 1200 pass through the female devices 25 and 26. The reading device can therefore detect these two female devices 25 and 26. The reader circuit can also detect that the female device 26 is further away than the female device 25.

The reading device can then determine the position of the female devices 25 and 26 more accurately by cross-referencing the detections carried out by each antenna 820. As two antennas 820 have detected the female device 26 while the antenna 820 situated between the two has not detected it, the reader circuit can deduce that the position of the female device 26 is situated in the centre of the antenna 820 which has not detected it. For the female device 25, two neighbouring antennas 820 have detected it, one having detected it from further away than the other; a triangulation of the detection distances makes it possible to know the position accurately.

A number of position-detection techniques can be used to obtain an accurate position. As an embodiment example, a person skilled in the art can refer to the locating techniques disclosed in the French patent application filed on 29 Aug. 2019 under the number 19-09528 for more detail.

The invention has been described in relation to a display stand hook. However, the invention is not limited to a display stand hook. By way of example, the invention can be used in educational games for children comprising a rod and elements to be stacked on the rod, the rod forming the male element corresponding to the hook and the elements to be stacked forming the female elements of the electronic tag type. The game can consist of giving an instruction to the child such as "Stack all the red elements". When all the requested elements have been stacked on the rod, a message can say "Well done! You did it". If, on the other hand, an element with the wrong colour has been stacked, the message can be "Careful! This element is not red, it is green". A more educational version according to the example of FIGS. 8 and 9 can make it possible to stack elements in a certain order.

In the case of an educational game for children, the pieces to be stacked can have a certain thickness. Thus, these pieces can have a hole that ensures the guiding of the female device on the male device. The antenna of the female device can advantageously be tilted with respect to the direction of the male device in order to improve the coupling between the female devices and the male device.

The invention claimed is:

1. Male device of a near-field communication system comprising:

an elongate portion in a threading direction extending between a first end and a second end, for receiving at least one female device around the elongate portion by threading from the first end, a plurality of near-field communication antennas placed inside the elongate portion and juxtaposed and aligned in the threading direction extending between the first end and the second end, each antenna comprising at least one conductive turn and comprising two connection terminals at the second end, for connection to a reader circuit, such that each antenna is individually connected to the reader circuit and usable one-by-one by the reader circuit, the conductive turn being positioned so as to produce at least one magnetic field generating a flux passing through the elongate portion perpendicularly to the threading direction when the antenna is traversed by a current produced by the reader circuit.

2. Male device according to claim 1, which comprises a mounting base integral with the second end, said base including a reader circuit connected to the connection terminals of said plurality of antennas.

3. Male device according to claim 1, in which the antennas of the plurality of antennas are disposed on an insulating substrate and are coplanar.

4. Male device according to claim 3, in which the antennas are coupled together in parallel and in which two adjacent antennas are oppositely polarized so that the direction of the magnetic field is inverted between two adjacent antennas.

5. Male device according to claim 4, in which the reader circuit is configured to activate a single antenna of the plurality of antennas at a time in order to determine a position of the female device on the elongate portion.

6. Male device according to claim 1, in which each antenna of the plurality of antennas comprises at least two connection terminals at the second end for connection to the reader circuit.

7. Near-field communication system comprising:
a male device according to claim 1, and
one or more electronic tags threaded onto the male device and having a suspension hole for a product or a product packaging, and an integrated circuit comprising a unique identifier for identifying the product with which it is associated.

8. Near-field communication system according to claim 7, wherein one or more of the electronic tags threaded onto the male device comprise a near-field communication antenna comprising at least one conductive turn having two connection terminals, said turn surrounding the suspension hole, said antenna converting a magnetic field into electrical current, the integrated circuit being connected to the connection terminals in order to be powered by the antenna.

9. Near-field communication system according to claim 7, wherein the elongate portion of the male device is a display stand hook.

* * * * *